(12) United States Patent
Sweetland

(10) Patent No.: US 12,011,880 B2
(45) Date of Patent: Jun. 18, 2024

(54) RECOATER SYSTEM FOR ADDITIVE MANUFACTURING

(71) Applicant: VulcanForms Inc., Burlington, MA (US)

(72) Inventor: Matthew Sweetland, Bedford, MA (US)

(73) Assignee: VulcanForms Inc., Burlington, MA (US)

( * ) Notice: Subject to any disclaimer, the term of this patent is extended or adjusted under 35 U.S.C. 154(b) by 470 days.

(21) Appl. No.: 16/884,534

(22) Filed: May 27, 2020

(65) Prior Publication Data
US 2020/0376773 A1 Dec. 3, 2020

Related U.S. Application Data

(60) Provisional application No. 62/853,423, filed on May 28, 2019.

(51) Int. Cl.
*B29C 64/393* (2017.01)
*B29C 64/153* (2017.01)
(Continued)

(52) U.S. Cl.
CPC .......... *B29C 64/393* (2017.08); *B29C 64/214* (2017.08); *B29C 64/236* (2017.08);
(Continued)

(58) Field of Classification Search
None
See application file for complete search history.

(56) References Cited

U.S. PATENT DOCUMENTS

| 8,973,768 B1 | 3/2015 | Jung et al. |
| 9,446,448 B2 | 6/2016 | McCoy et al. |

(Continued)

FOREIGN PATENT DOCUMENTS

| CN | 104475729 A | 4/2015 |
| CN | 205044181 U | 2/2016 |

(Continued)

OTHER PUBLICATIONS

English translation of EP-1439050-B1 retrieved from Espacenet on Nov. 17, 2022 (Year: 2022).*

(Continued)

*Primary Examiner* — Francisco W Tschen
*Assistant Examiner* — Elisa H Vera
(74) *Attorney, Agent, or Firm* — Wolf, Greenfield & Sacks, P.C.

(57) ABSTRACT

Disclosed embodiments relate to recoater systems for use with additive manufacturing systems. A recoater assembly may be adjustable along multiple degrees of freedom relative to a build surface, which may allow for adjustment of a spacing between the recoater assembly and the build surface and/or an orientation of the recoater assembly relative to an orientation of the build surface. In some embodiments, the recoater assembly may be supported by four support columns extending above the build surface, and attachments between the recoater assembly and the support columns may be independently adjustable to adjust the recoater relative to the build surface.

23 Claims, 9 Drawing Sheets

(51) Int. Cl.
*B29C 64/214* (2017.01)
*B29C 64/236* (2017.01)
*B29C 64/245* (2017.01)
*B29C 64/25* (2017.01)
*B29C 64/371* (2017.01)
*B33Y 10/00* (2015.01)

(52) U.S. Cl.
CPC .......... *B29C 64/245* (2017.08); *B29C 64/153* (2017.08); *B29C 64/25* (2017.08); *B29C 64/371* (2017.08); *B33Y 10/00* (2014.12)

(56) References Cited

U.S. PATENT DOCUMENTS

| | | | |
|---|---|---|---|
| 9,956,612 B1 | 5/2018 | Redding et al. | |
| 9,956,727 B2* | 5/2018 | Steele | B29C 35/0805 |
| 10,022,795 B1 | 7/2018 | Redding et al. | |
| 11,247,396 B2 | 2/2022 | Sweetland | |
| 2002/0025244 A1 | 2/2002 | Kim | |
| 2005/0280185 A1 | 12/2005 | Russell et al. | |
| 2007/0074659 A1 | 4/2007 | Wahlstrom | |
| 2010/0207288 A1 | 8/2010 | Din | |
| 2013/0108726 A1* | 5/2013 | Uckelmann | A61C 13/20 425/375 |
| 2014/0085620 A1 | 3/2014 | Lobovsky et al. | |
| 2014/0263209 A1 | 9/2014 | Burris et al. | |
| 2015/0158248 A1 | 6/2015 | Huang | |
| 2015/0276119 A1 | 10/2015 | Booker | |
| 2015/0367447 A1 | 12/2015 | Buller et al. | |
| 2016/0052054 A1 | 2/2016 | Orange et al. | |
| 2016/0052165 A1 | 2/2016 | Hartmann | |
| 2016/0067781 A1 | 3/2016 | Kawada et al. | |
| 2016/0121397 A1 | 5/2016 | Aydin et al. | |
| 2016/0158889 A1 | 6/2016 | Carter et al. | |
| 2016/0349215 A1* | 12/2016 | Todorov | B29C 64/386 |
| 2016/0368050 A1 | 12/2016 | Morris et al. | |
| 2017/0021455 A1 | 1/2017 | Dallarosa et al. | |
| 2017/0036400 A1* | 2/2017 | Loeffler | B29C 64/245 |
| 2017/0050278 A1 | 2/2017 | Jaster | |
| 2017/0056975 A1 | 3/2017 | Carter et al. | |
| 2017/0072643 A1 | 3/2017 | Ng et al. | |
| 2017/0129049 A1 | 5/2017 | Schwarze et al. | |
| 2017/0146382 A1 | 5/2017 | Gold et al. | |
| 2017/0259339 A1 | 9/2017 | Riva et al. | |
| 2017/0266890 A1 | 9/2017 | Volk | |
| 2017/0282297 A1 | 10/2017 | Ohno | |
| 2017/0326806 A1* | 11/2017 | Reynolds | B22F 12/00 |
| 2018/0043680 A1* | 2/2018 | Ochi | B29C 64/40 |
| 2018/0169944 A1 | 6/2018 | Hofmann et al. | |
| 2018/0196104 A1* | 7/2018 | Chang | G01R 31/343 |
| 2018/0200792 A1 | 7/2018 | Redding et al. | |
| 2018/0207722 A1 | 7/2018 | Feldmann et al. | |
| 2018/0236549 A1 | 8/2018 | Spears et al. | |
| 2018/0326712 A1* | 11/2018 | Raghavan | B33Y 50/02 |
| 2018/0348367 A1* | 12/2018 | Crear | B29C 64/393 |
| 2018/0348492 A1 | 12/2018 | Pavlov et al. | |
| 2019/0039135 A1 | 2/2019 | Hollahan | |
| 2019/0118482 A1* | 4/2019 | Braunroth | B33Y 10/00 |
| 2019/0134911 A1 | 5/2019 | Jones et al. | |
| 2019/0143406 A1 | 5/2019 | Carter et al. | |
| 2019/0168443 A1 | 6/2019 | Wohlgemuth | |
| 2019/0193150 A1 | 6/2019 | Hudelson et al. | |
| 2019/0299286 A1 | 10/2019 | Feldmann et al. | |
| 2019/0366433 A1* | 12/2019 | Aydin | B22F 12/90 |
| 2020/0039000 A1 | 2/2020 | Sweetland | |
| 2020/0047333 A1 | 2/2020 | Wiktor | |
| 2020/0108465 A1 | 4/2020 | Sweetland | |
| 2020/0122389 A1 | 4/2020 | Binek et al. | |
| 2020/0331061 A1 | 10/2020 | Redding et al. | |
| 2020/0376761 A1 | 12/2020 | Sweetland | |
| 2020/0376762 A1 | 12/2020 | Sweetland | |
| 2021/0339318 A1 | 11/2021 | Dunbar et al. | |
| 2022/0009030 A1 | 1/2022 | Dadelszen et al. | |
| 2022/0152926 A1 | 5/2022 | Sweetland | |
| 2023/0373160 A1 | 11/2023 | Sweetland | |

FOREIGN PATENT DOCUMENTS

| | | | |
|---|---|---|---|
| EP | 1439050 B1 * | 8/2006 | B22F 3/004 |
| EP | 3 536 484 A1 | 9/2019 | |
| JP | 2015020328 A * | 2/2015 | |
| JP | 2015-193135 A1 | 11/2015 | |
| WO | WO 2013/117185 A1 | 8/2013 | |
| WO | WO 2015/151831 A1 | 10/2015 | |
| WO | WO 2017/161585 A1 | 9/2017 | |
| WO | WO 2018/033405 A1 | 2/2018 | |
| WO | WO 2019/094269 A1 | 5/2019 | |

OTHER PUBLICATIONS

International Search Report and Written Opinion for International Application No. PCT/US2020/034649, dated Oct. 23, 2020.
International Search Report and Written Opinion for International Application No. PCT/US2020/034651, mailed Aug. 10, 2020.
International Search Report and Written Opinion for International Application No. PCT/US2020/034658, mailed Aug. 11, 2020.

* cited by examiner

RECOATER SYSTEM FOR ADDITIVE MANUFACTURING

RELATED APPLICATIONS

This Application claims the benefit of priority under 35 U.S.C. § 119(e) of U.S. Provisional Application Ser. No. 62/853,423, filed May 28, 2019, the disclosure of which is incorporated herein by reference in its entirety.

FIELD

Disclosed embodiments are related to additive manufacturing recoater systems and related methods.

BACKGROUND

Additive manufacturing systems employ various techniques to create three-dimensional objects from two-dimensional layers. After a layer of precursor material is deposited onto a build surface, a portion of the layer may be fused through exposure to one or more energy sources to create a desired two-dimensional geometry of solidified material within the layer. Next, the build surface may be indexed, and another layer of precursor material may be deposited. For example, in conventional systems, the build surface may be indexed downwardly by a distance corresponding to a thickness of a layer. This process may be repeated layer-by-layer to fuse many two-dimensional layers into a three-dimensional object.

Some additive manufacturing systems may include a system for depositing and/or spreading a precursor material onto a build surface. For example, in powder bed fusion systems, a recoater assembly may be used to deposit a layer of powder onto the build surface. A recoater assembly may include a recoater blade connected to a recoater support structure, which may be controlled so as to drag the recoater blade across the build surface, smoothing the deposited powder to provide a layer of uniform thickness.

SUMMARY

In one embodiment, a method of leveling a build surface of an additive manufacturing system comprises detecting an orientation of a build surface, comparing the orientation of the build plate to a reference orientation, depositing a layer of material having a non-uniform thickness onto a portion of the build surface, and fusing at least a portion the layer of material to form at least a portion of a build surface.

In another embodiment, a method of locating a contact point between a recoater blade and an obstacle on a build surface comprises translating a recoater blade in a first orientation across a build surface in a first pass and detecting a first contact point on the build surface based on a first contact between the recoater blade and an obstacle on the build surface. The method further comprises translating the recoater blade in a second orientation across the build surface in a second pass detecting a second contact point on the build surface based on a second contact between the recoater blade and the obstacle during the second pass, and determining a position of the obstacle on the build surface based on the first contact point and the second contact point.

In a further embodiment, a method of operating a recoater of an additive manufacturing system comprises obtaining a shape of a layer in an additive manufacturing process, determining a portion of the shape of the layer having an edge parallel to a recoater blade when the recoater blade is in a first orientation, displacing the recoater blade across a portion of the layer, and moving the recoater blade from the first orientation to a second orientation prior to the recoater blade contacting the edge. The recoater blade is not parallel to the edge when the recoater is in the second orientation.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
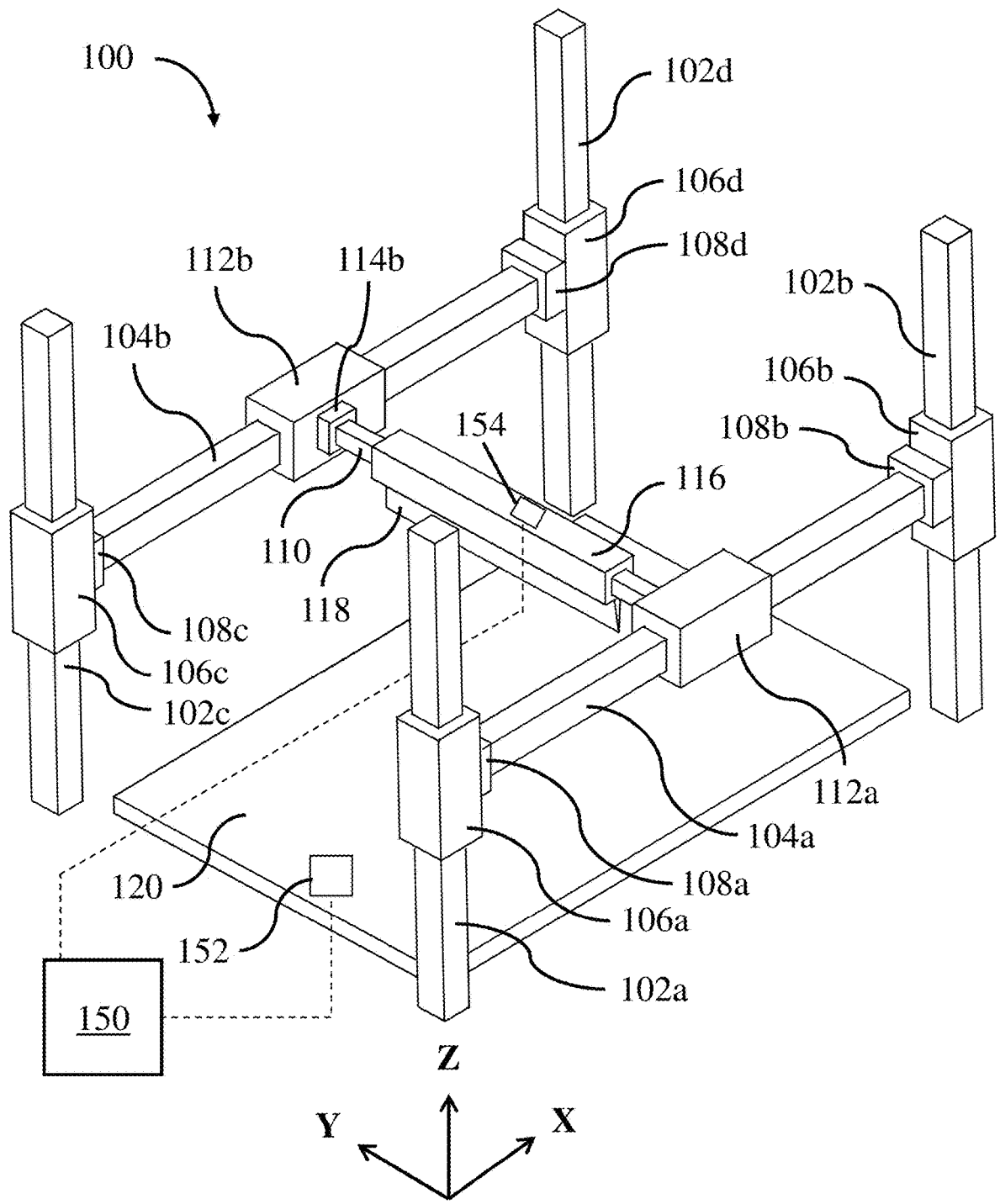
FIG. 1 is a schematic perspective view of one embodiment of an additive manufacturing system.

The inventors have recognized and appreciated numerous advantages associated with recoater assemblies that are movable and adjustable relative to a fixed build surface in an additive manufacturing system. For example, such adjustability of the recoater assembly may facilitate alignment of the recoater. With any additive manufacturing system employing a recoater to deposit layers of powder, there are at least two important alignments. First, the recoater should be level across the width of the build surface. That is, the recoater itself should be level along its length with respect to the build surface. Second, the recoater should be level along the length of the build surface. That is, the recoater should maintain a constant separation from the build surface as it moves relative to the build surface (e.g., along a direction perpendicular to the length of the recoater) to deposit a layer of powder. If the recoater is not well aligned in either of the two above senses, errors and/or defects may result. For example, a misaligned recoater could result in deposited powder layers of non-uniform thicknesses, which may compromise the quality of a manufactured part. Additionally, a misaligned recoater may undesirably come into contact with the build surface or powder bed, which could lead to damage to a manufactured part and/or damage to the additive manufacturing system. With layer thicknesses that may be on the order of only tens of micrometers, even slight misalignments may result in such errors and/or damage. In conventional systems, in which support structures for the recoater are spatially fixed relative to the build surface, alignment is typically performed once during the initial setup of the additive manufacturing system. Because precision alignment is needed to avoid errors, the initial alignment of an additive manufacturing system may dictate a significant portion of the machine architecture. Yet, regardless of how well an initial alignment may have been performed, additional realignments may be required at later times, such as after an exchange of a recoater blade or upon beginning a new manufacturing process. Because the recoater support structures may be fixed relative to the system in conventional architectures, these later realignments often require substantial manual intervention, which may involve increased demand on personnel as well as lost processing time.

In view of the above, the inventors have recognized and appreciated numerous advantages associated with additive manufacturing systems that include a recoater assembly that is movable along multiple degrees of freedom relative to a build surface. Compared to conventional recoater systems that may only be translatable along a single direction parallel to a build surface, the recoater assemblies described herein may be movable along multiple directions relative to a build surface. As described in more detail below, such movement of the recoater assembly may facilitate various adjustments and alignments of the recoater assembly to provide improved precision and reliability in an additive manufacturing process, and may allow for the size of the additive manufacturing system to be scaled up.

With respect to alignment of a recoater assembly, in some embodiments, a recoater assembly that is movable along multiple degrees of freedom relative to a build surface may allow for fast and easy reorientation of the recoater to correct for any misalignments. For example, a recoater assembly may be moveable along a first degree of freedom to correct for a misalignment of the recoater blade level across a width of a build surface, and the recoater blade assembly may be moveable along a second degree of freedom to correct for misalignment of the recoater along a length of the build surface. In this manner, many of the challenges discussed above regarding precision manual alignment of a fixed recoater system may be avoided. In some embodiments, such adjustment and realignment of a recoater assembly may be automated. For example, an additive manufacturing system may include one or more sensors to detect one or more alignments of the recoater, and the recoater assembly may move along the multiple degrees of freedom in response to the sensors detecting that the recoater is misaligned.

With respect to increasing the scale of an additive manufacturing system, the inventors have recognized and appreciated that conventional approaches to additive manufacturing system design may not be well suited for larger scale systems, which may facilitate fabrication of larger parts and/or parallel production of a larger number of parts compared to conventional smaller scale systems. For example, some challenges may arise from an increase in the amount of powder required in larger systems, and correspondingly, an increase in the mass of the powder supported on the build surface. As noted above, in a conventional additive manufacturing system, a build surface may move relative to the rest of the system while a recoater assembly may remain vertically stationary. However, the inventors have recognized and appreciated that in larger scale systems, it may be advantageous to employ a stationary build surface to avoid having to move a large powder mass by small increments corresponding to the layer thickness. For instance, moving a build surface that supports a large mass may put undue stress on various components of the additive manufacturing system and may greatly reduce the system's achievable precision. Additionally, the mass of the powder supported on the build surface may be variable throughout a manufacturing process as additional layers of powder are deposited onto the build surface.

In view of the above, the inventors have recognized and appreciated that a recoater assembly that is movable along multiple degrees of freedom relative to a build surface may advantageously facilitate vertical movement of the recoater relative to a fixed build surface. In some embodiments, a recoater assembly may deposit a layer of material onto the build surface, and subsequently the recoater may be indexed upwardly above the fixed build surface by a distance corresponding to the layer thickness. In this manner, the system may only be required to move the smaller and constant mass of the recoater assembly to deposit the layers of powder in an additive manufacturing process, rather than moving the large and variable mass of the powder bed and build surface.

In addition to the above, the inventors have appreciated that a larger scale additive manufacturing system may require larger support structures to support the various components of the system, such as the build surface, recoater assembly, and/or optics assemblies. Relative to the support structures in conventional smaller scale additive manufacturing systems, these larger (e.g., longer) support structures may be prone to larger deflections, which may result in misalignment between components of the additive manufacturing system, such as between a recoater assembly and a powder bed, potentially resulting in manufacturing errors or defects. Accordingly, some aspects described herein may facilitate adjustment of the components of the system (e.g., the recoater) to correct for such misalignments and/or support structure deflection.

In some embodiments, an adjustable recoater assembly may include a recoater that is movable along support columns and support rails above a build surface to facilitate adjustment of the recoater along multiple degrees of freedom. For example, in one embodiment, a recoater assembly may include four support columns extending above the build surface, and a recoater may be supported on a pair of support rails extending between the support columns. In particular, a first support rail may extend between first and second support columns and a second support rail may extend between third and fourth support columns. The recoater may be movable along the support rails to allow for movement of the recoater blade along the length of the build surface to deposit a layer of powder onto the build surface. Additionally, each of the first and second support rails may be coupled to the support columns via attachments that are independently displaceable along the support columns. As described in more detail below, displacing the attachments along the support columns may allow for reorientation of the recoater relative to the build surface about at least two independent axes, which may facilitate alignment of the recoater relative to the build surface and/or to correct for misalignment resulting from deflection of one or more support structures. In particular, various support structures of a recoater system may exhibit non-negligible amounts of deflection (especially as the system size is scaled up to larger sizes) which may lead to varying spacing between the recoater and the build surface as the recoater moves along support rails. For example, middle portions of recoater support rails supported near their ends may exhibit greater deflection relative to end portions of the support rails. With individual layer heights that may be on the order of tens of micrometers in an additive manufacturing process, such variable deflection can correspond to a substantial fraction of the layer height, which may lead to defects in a manufactured part. Accordingly, as discussed further below, some aspects described herein may allow for a recoater assembly to dynamically adjust a spacing between the recoater and the build surface as the recoater moves along support rails to accommodate for deflection of the support rails, thereby maintaining a constant layer thickness.

Moreover, the support rails and recoater may be vertically displaced along the support columns to index the recoater to a new position corresponding to a subsequent powder layer in a manufacturing process. In this manner, the recoater assembly may be used in connection with an additive manufacturing system having a fixed build surface (e.g., a large scale additive manufacturing system).

In addition to the above, the inventors have recognized that in some additive manufacturing systems, a build surface may be misaligned within the system such that the build surface is not level relative to a system master level orientation, which may lead to errors, defects, and/or damage as discussed above. According to some aspects, the adjustable recoater assemblies described herein may facilitate leveling of a build surface prior to beginning an additive manufacturing process. For example, in some embodiments, an adjustable recoater assembly may be operated to form one or more partial powder layers having non-uniform thicknesses in order to achieve a level build surface. After depositing each partial layer, the partial layer may be at least partially fused. For example, the entire partial layer may be fused, or portions of the partial layer may be fused, such as portions corresponding to anchor points in a subsequent manufacturing process. By depositing and fusing the partial layers, portions of the build surface that are "low" (i.e., farther from a point of reference above the build surface, such as a recoater or a laser system) may be brought closer to the remainder of the build surface. Of course, multiple partial layers may be deposited and fused in situations in which a build surface is significantly out of level and/or in which multiple, thinner partial layers are desired.

Another advantage of the adjustable recoater systems described herein is that the recoater may be able to be moved over unused powder piles during an additive manufacturing process, which may allow for a reduction of powder waste. In a conventional system, a recoater will often be pushing excess, unused powder as it approaches the end of its travel across a build surface. This unused powder will typically be pushed off of the build surface, and in many cases is discarded. In contrast, the recoater assemblies described herein, which may be movable along multiple degrees of freedom relative to a build surface may, at the end of a pass, be moved away from the build surface to step over the unused powder, allowing the powder to be reused on the next pass, thereby reducing waste and lowering costs.

While certain advantages associated with a recoater assembly that is movable in a direction perpendicular to a build surface (e.g., vertically above the build surface) and rotatable about axes parallel to a plane of the build surface (e.g., to adjust the alignment of the recoater), the inventors have further recognized and appreciated advantages associated with a recoater that is rotatable about an axis perpendicular to the plane of the build surface. Accordingly, in contrast to conventional additive manufacturing systems in which a recoater is limited to travelling across a build surface in a direction perpendicular to the length of the recoater, the recoater system described herein may allow for the recoater to be moved across the build surface while the recoater blade is not perpendicular to the direction of movement of the recoater. In some embodiments, such adjustment of the angle of the recoater blade may be utilized to direct powder in a desired direction on the build surface. Typically, powder will preferentially track in a direction perpendicular to the recoater blade. As such, a recoater that can be angled with respect to its direction of motion may be able to push powder in various directions as desired. In this manner, powder may be steered to desired portions of the build surface. For example, when forming a layer, certain regions of the layer may contain larger quantities of melted powder. Because powder may shrink as it melts, these regions may consume more powder than other regions. The recoater may compensate for this comparative deficiency in powder by directing powder to such regions of high usage. Alternatively or additionally, the recoater may be used to steer excess powder away from regions of comparatively lower usage during an additive manufacturing process.

In addition to the above, the inventors have appreciated that adjustability of a recoater angle according to some embodiments described herein may provide numerous advantages related to detection and/or avoidance of obstacles on the build surface. For example, in some instances a recoater may encounter an obstacle during an additive manufacturing process (e.g., a high point from a previous layer that protrudes into the current layer, or a contaminant) as it moves along the build surface. In a conventional system in which the angle of the recoater is constrained to be perpendicular to its direction of travel, a collision event with an obstacle may only inform an operator that an obstacle exists somewhere along a line defined by the recoater blade. In contrast, the adjustable recoater systems described herein may allow an operator to determine the specific location of an obstacle on the build surface. For example, in one embodiment, after detecting a first position of a collision with an obstacle on a first pass of the recoater, the recoater orientation may be adjusted to a new angle and a second position of the collision with the obstacle may be detected in a second pass. In this manner, the position of the obstacle may be determined based on the intersection of first and second lines corresponding to the orientations of the recoater blade at the first and second collision positions.

Additionally, the inventors have appreciated that being able to adjust the angle of a recoater as it travels across a build surface may offer advantages associated with avoiding certain interferences that may occur between the recoater and a manufactured part. Often, a layer of a manufactured part may contain one or more straight edges, and it may be desirable to avoid parallel contact between a recoater blade and such straight edges. For example, parallel contact may cause the recoater system to jam, may damage the recoater blade, and/or may cause damage to the part being manufactured. Although some parallel contacts may be avoided with thoughtful part layout on the build surface, some parallel contacts may be inevitable in an additive manufacturing system with a recoater having a fixed orientation. In contrast, the adjustable recoater systems described herein may be able to dynamically adjust an orientation of the recoater blade relative to an orientation of a part edge as it travels across the build surface, thus preventing and/or avoiding parallel contacts.

In addition to the above, some additive manufacturing systems, including many metal additive manufacturing systems, may utilize an enclosed build volume containing a process gas selected to maintain a desired gas environment around the build surface during an additive manufacturing process. For example, some systems may utilize inert gasses to avoid undesired oxidation of the powder and/or to limit impurities or other undesirable processes. If a location within the build volume needs to be accessed during an additive manufacturing process, such as if an one or more components of the additive manufacturing system needs to be adjusted or replaced, the process gas may need to be purged from the build volume. In larger scale systems, which have correspondingly larger build volumes, such purging of the process gas may result in comparatively longer periods in which the additive manufacturing system is out of service, as well as larger amounts of gas usage. The inventors have appreciated that these increases in the time that the system is out of service, the time that an operator is occupied maintaining the system, and the larger volumes of gas consumed during purging all contribute to higher costs and reduced efficiencies of the additive manufacturing systems. Accordingly, as described in more detail below, some aspects described herein relate to systems for accessing the interior of the build volume to perform adjustment and or replacement of one or more components (e.g., replacement of a recoater blade) without requiring purging of the entire build volume.

In some embodiments, an additive manufacturing system may include a recoater blade exchange system that is configured to allow a recoater blade to be exchanged from a non-inert external environment (i.e., an open manufacturing space exterior to an enclosed build volume) without requiring the enclosed build volume to be purged. In some instances, exchange of a recoater blade may be desirable when the recoater blade becomes damaged or otherwise due for replacement. For example, even if not damaged (e.g., by a collision with an obstacle), normal wear on a recoater blade may lead to inconsistencies in deposited layer thicknesses, and thus, it may be desirable to replace a recoater blade at regular intervals (e.g., after a predetermined number of passes of the recoater), including one or more times during an additive manufacturing process. In one embodiment, a recoater blade exchange system may include one or more valves in a build volume that may interface with various blade exchange chambers. A recoater may be moved within the build volume so as to be adjacent to a valve, at which point the recoater blade may be released and pulled into a blade exchange chamber through the valve. A new recoater blade may be transferred from the blade exchange chamber through a valve into the build volume, and then attached to the recoater. In this manner, the recoater blade may be replaced one or more times throughout an additive manufacturing process without requiring purging of the build volume and/or direct access to the interior of the build volume, and thus disruptions of the additive manufacturing process may be minimized.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIGS. 1-4 are schematic representations of an additive manufacturing system 100, according to some embodiments. In the depicted embodiment, the additive manufacturing system 100 includes four support columns 102, two support rails 104, a recoater assembly including a recoater support 110, a recoater blade housing 116, and recoater blade 118, as well as a build surface 120. The four support columns and two support rails support the recoater assembly at a desired height and orientation above the build surface, as discussed below.

Figure 2:
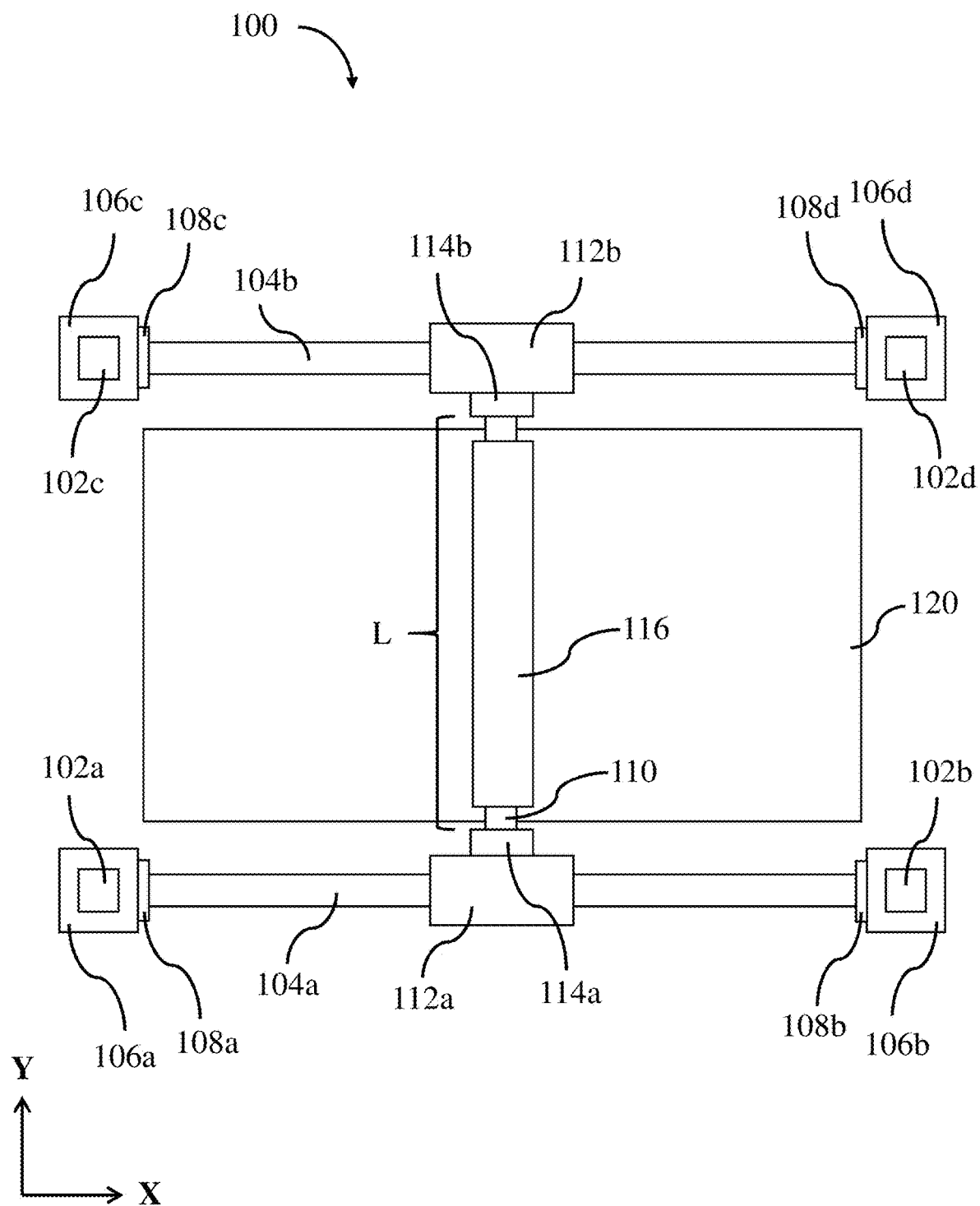
FIG. 2 is a schematic top view of the additive manufacturing system of FIG. 1.
Figure 3:
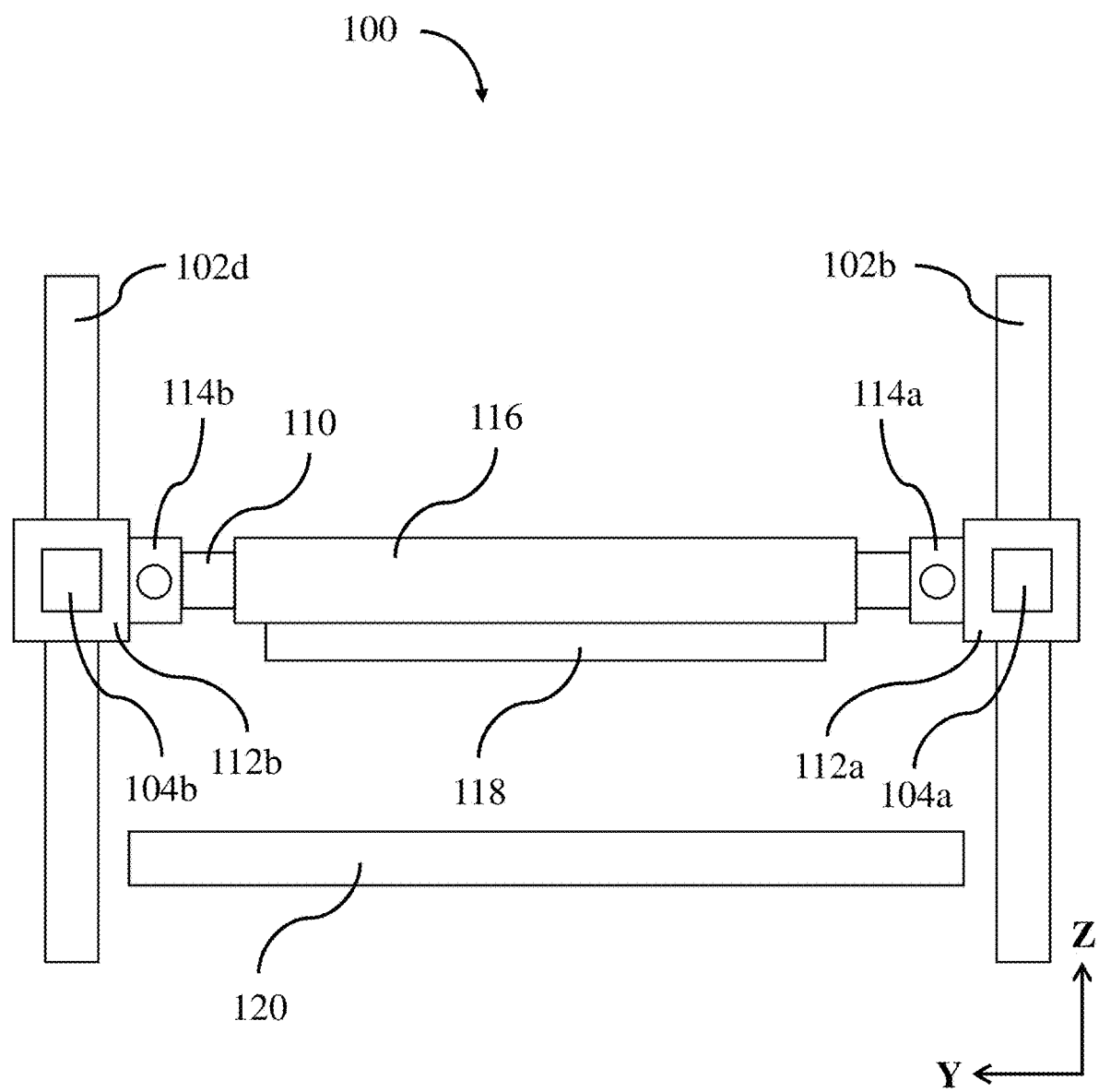
FIG. 3 is a schematic cross sectional front view of the additive manufacturing system of FIG. 1.
Figure 4:
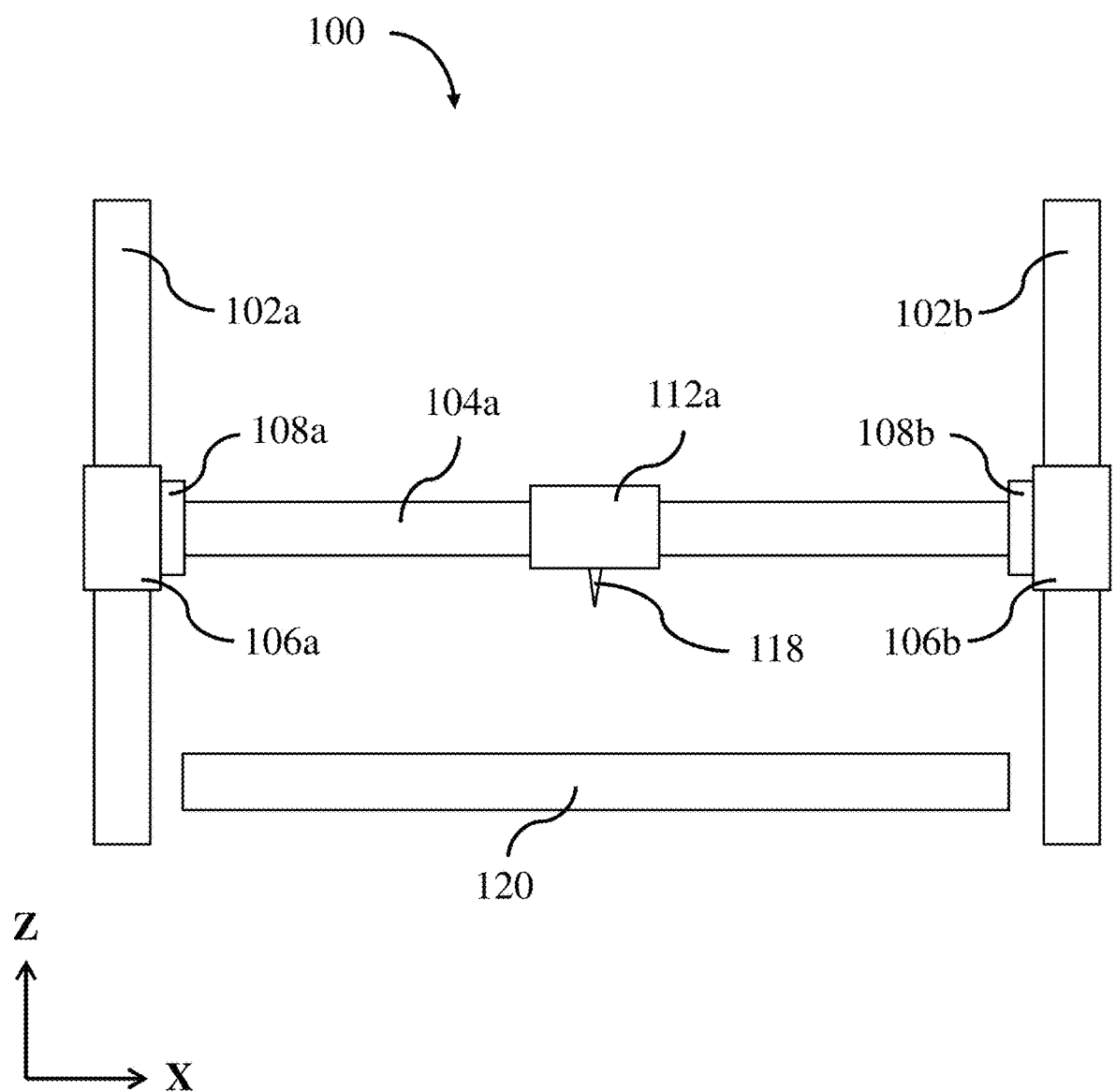
FIG. 4 is a schematic side view of the additive manufacturing system of FIG. 1.

Each support column 102 may be located near a corner of a build surface 120, as may best be seen in FIGS. 1-2. For the sake of clarity, the build surface may be described as being contained within a plane parallel to an XY plane (i.e., a plane defined by an X axis and a Y axis) shown in FIGS. 1-4. An X axis may be a direction parallel to a length of a build surface, while a Y axis may be a direction parallel to a width of a build surface. It should be understood that the current disclosure is not limited to any particular positions for the support columns with respect to the build surface, e.g., in either the X or Y directions. For example, the build surface 120 need not be contained within a perimeter defined by the four support columns, as shown in FIGS. 1-4. In some embodiments, portions of the build surface 120 may extend beyond one or more support columns 102. Moreover, while a system including four support columns 102 is shown in FIGS. 1-4, it should be understood that other configurations may be suitable. For example, some embodiments may include more than four support columns.

For the sake of clarity, each of four support columns 102 may be individually identified. Without loss of generality, a first support column 102a may be a support column nearest to an origin of a coordinate system, as shown in FIGS. 1-4. A second support column 102b may be located at a first distance from the first support column along an axis parallel to the X axis. A third support column 102c may be located at a second distance from the first support column along an axis parallel to the Y axis. A fourth support column 102d may be located at a first distance from the first support column along an axis parallel to the X axis and at a second distance from the first support column along an axis parallel to the Y axis. Each support column may extend in a vertical direction. As used herein, the term "vertical" may refer to a direction that is substantially parallel to a Z axis, wherein the Z axis may be defined as being perpendicular to a reference plane which may, for example, include a build surface 120 that is level. In this manner, the support columns 102 may extend vertically above the build surface 120.

The system 100 further includes two support rails 104 be connected to the four support columns 102. In particular, each of the two support rails is connected to two of the four support columns 102. A length of each support rail may be along an axis parallel to the X axis, as shown in FIGS. 1-4. In the depicted embodiment, a first support rail 104a is connected to the first support column 102a and the second support column 102b, and a second support rail 104b is connected to the third support column 102c and the fourth support column 102d.

Coupling between the support rails 104 and the support columns 102 is achieved via translational attachments 106 and rotational attachments 108. In particular, the first support rail 104a is coupled to the first support column 102a via a first translational attachment 106a and a first rotational attachment 108a. The first support rail 104a is also coupled to the second support column 102b via a second translational attachment 106b and a second rotational attachment 108b. Similarly, the second support rail 104b is coupled to the third support column 102c and the fourth column 102d via third and fourth translational attachments 106c and 106d, respectively, as well as third and fourth rotational attachments 108c and 108d, respectively.

The various translational attachments 106 may allow ends of each support rail 104 to translate vertically (i.e., in a direction parallel to the Z axis) along the support columns 102. The rotational attachments 108 may allow the support rails 104 to rotate about connection points between each support rail and a corresponding support column 102 to which the support rail is attached. For example, referring to FIG. 4, the first rotational attachment 108a may allow the first support rail 104a to rotate about a connection point between the first support rail 104a and the first support column 102a. In this embodiment, such rotation is about an axis parallel to the Y axis.

In some instances, if two ends of a support rail 104 translate an equal distance along corresponding support columns, the support rail may translate vertically and an orientation of the support rail may not change. In other instances, if the two ends of the support rail 104 translate by different distances along the corresponding support columns, an orientation of the support rail may change. This change of orientation may be facilitated by the rotational attachments 108. Moreover, in some embodiments in which a support rail may change orientation, the support rail may be configured to extend and/or retract to accommodate a variable distance between attachments between the support rail and support columns.

As noted above, the recoater assembly includes a recoater support 110, a recoater blade housing 116, and a recoater blade 118. The recoater blade housing 116 may be configured to securely hold the recoater blade, and may be mounted to the recoater support. The recoater support 110 may be coupled to the support rails 104. In the depicted embodiment, the recoater support 100 extends between the support rails 104 along an axis parallel to the Y axis, as shown in FIG. 1. In particular, the recoater rail 110 is coupled to the first support rail 104a via a first recoater translational attachment 112a and a first recoater rotational attachment 114a. Similarly, the recoater support 110 is coupled to the second support rail 104b via a second recoater translational attachment 112b and a second recoater rotational attachment 114b.

The recoater translational attachments 112 may allow ends of the recoater support 110 to translate horizontally relative to the build surface (i.e., in a direction parallel to the X axis, as shown in FIG. 1) along the support rails 104. The recoater rotational attachments 114 may allow the recoater support 110 to rotate about connection points between the recoater support and support rails 104. For example, referring to FIG. 2, the first recoater rotational attachment 114a may allow the recoater support 110 to rotate about a connection point between the recoater support 110 and the first support rail 104a. In some embodiments, such rotation may be about an axis parallel to the Z axis. In some embodiments, the rotation may alternatively or additionally be about an axis parallel to the X axis. That is, the recoater rotational attachments 114 may enable rotation about at least two axes (i.e., axes parallel to the X and Z axes, as shown in FIG. 1).

In some applications, repositioning of the various translational attachments described herein may result in different positions and orientations for the recoater assembly. For example, equal translation of four translational attachments 106 may cause the recoater to translate vertically without changing orientation relative to the build surface 120. Differential translation of pairs of translational attachments 106 may reorient the recoater relative to the build surface. For example, translating the first translational attachment 106a and second translational attachment 106b a first distance that is different than a second distance translated by the third translational attachment 102c and fourth translational attachment 106d may "roll" the recoater (i.e., cause the recoater to rotate about an axis parallel to the X axis). Similarly, translating the first translational attachment 106a and the third translational attachment 106c differently than the second translational attachment 106b and the fourth translational attachment 106d may "pitch" the recoater (i.e., cause the recoater to rotate about an axis parallel to the Y axis). Similarly, repositioning of the recoater translational attachments may result in different positions and orientations for the recoater assembly. For example, equal translation of two recoater translational attachments 112 may cause the recoater to translate horizontally (i.e., in a direction parallel to an X axis) without changing orientation. Differential translation of recoater translational attachments may reorient the recoater assembly within a plane defined by the translational attachments 106. That is, translating a first recoater translational attachment 112a differently than a second translational attachment 112b may "yaw" the recoater (i.e., cause the recoater to rotate about an axis parallel to a Z axis). Of course, it should be understood that various combinations of such roll, pitch, and yaw adjustments may be used to achieve a desired orientation for the recoater assembly relative to the build surface.

It should be appreciated that some rotations or other adjustments of a recoater assembly may result in a change in an effective length of the recoater assembly (depicted as "L" in FIG. 2). For example, when the recoater assembly yaws, a distance between attachments on two support rails may change. Similarly, when the recoater rolls, a distance between the two support rails change may change. Accordingly, in some embodiments, the recoater assembly may be configured to adjust its length L to accommodate these changes in distance between attachments and/or support rails. For example, the translational attachments 114 and/or rotational attachments 116 may include extendable linkages (not depicted) or other suitable structures to accommodate such extension. Alternatively or additionally the recoater support 110 may be extendable (e.g., via a telescopic configuration) to accommodate such changes in length of the recoater assembly.

Depending on the particular embodiment, it may be desirable to reposition and/or reorient a recoater for a variety reasons. For example, the recoater assembly may be translated in the X direction to uniformly spread powder over the build surface 120 in preparation for patterning by exposure to an energy source, such as one or more laser energy sources. Translation of the recoater in the X direction may be accomplished, for example, by translating the first and second recoater translational attachment 112a and 112b a desired distance along the first and second support rails 104a and 104b, respectively.

In addition, the recoater assembly may be repositioned vertically relative to the build surface after depositing a layer of material on the build surface (e.g., during intervals between patterning layers in a manufacturing process) in order to index the recoater assembly to a position corresponding to subsequent layers of the manufacturing process. As discussed previously, in some additive manufacturing systems, a build surface may be indexed downwardly with respect to a recoater a distance equal to a desired layer height. However, there may be certain disadvantages associated with moving a build surface, as discussed above. Accordingly, the systems described herein allow the recoater to be indexed upwardly with respect to the build surface, which may remain fixed in position throughout the manufacturing process. This indexing may correspond to translation of the recoater in the Z direction, which may be accomplished by the translating four translational attachments 106 a distance along respective support columns 102 (e.g., a distance corresponding to the layer thickness).

Depending on the particular embodiment, a distance between a recoater and a build surface may be measured and/or controlled via any suitable types of measurement or control systems. For example, vertical motion of a recoater assembly (e.g., along support columns 102) may be driven by motion stages such as ball screw driven stages, linear motor stages, linear actuators, pneumatic actuators, hydraulic actuators, and so on. Moreover, the position of such vertical motion stages may be tracked and/or measured via systems such as rotary encoders on ball screws, linear optical encoders, LVDT sensors, laser displacement sensors, and so on. For example, in one embodiment, a vertical motion stage may be driven by a ball screw driven linear actuator, and the position of the motion stage may be tracked via linear optical encoders. Of course, it should be appreciated that the current disclosure is not limited to any particular combination of types of vertical motion stages and/or systems for tracking or measuring the position of the motion vertical motion stages. Similarly, the systems disclosed herein may include any suitable types of motion stages for accommodating movement of the recoater assembly along the support rails 104. For example, the recoater assembly may be driven along the support rails via ball screw driven linear slides, belt driven linear actuators, pneumatic actuators, hydraulic actuators, and so on, and the position of the recoater assembly may be monitored via one or more of rotary encoders, linear optical encoders, LVDT sensors, laser displacement sensors, and so on.

As discussed above, the adjustable recoater assemblies described herein may advantageously allow for the recoater assembly to be adjusted to achieve a desired alignment of the recoater assembly. For example, differential displacement of the various attachments may enable reorientation of a recoater about various axes. In some instances, the ability to reorient a recoater about axes parallel to a build surface may obviate the need for precision alignment of the recoater during initial setup of the additive manufacturing system. Furthermore, later realignments of the recoater may be performed automatically without operator intervention, which may reduce the time that the additive manufacturing system is inoperable for maintenance. It should be appreciated that such benefits of the adjustable recoater assemblies described herein in connection to alignment between the recoater and a build surface may be applicable to additive manufacturing systems with either a fixed build surface or a movable build surface.

In some embodiments, an additive manufacturing system may include one or more sensors and actuators that may be used to at least partially automate an alignment process of a recoater assembly. For example, the system 100 of FIG. 1 includes a first sensor 152 configured to detect an orientation of the build surface 120, and a second sensor 154 configured to detect an orientation of the recoater assembly. If a recoater is determined to be out of alignment with the build surface (e.g., based on an orientation measured by the sensors 152 and 154), the recoater may be reoriented to be brought into alignment with the build surface. Each of the sensors 152 and 154 is operatively coupled to a controller 150, which may determine a suitable adjustment to bring the recoater assembly and the build surface into alignment. For example, the controller 150 may determine an adjustment to the recoater assembly such that the recoater assembly is parallel to the build surface after the adjustment. Moreover, the controller 150 may be operatively coupled to one or more actuators associated with one or more of the attachments 106, 108, 112 and/or 114, and the controller may control operation of each actuator to move the recoater assembly and achieve a desired adjustment. Depending on the particular embodiment, the one or more sensors may include contact probes, laser displacement sensors, accelerometers, gyroscopes, and/or or any other suitable type of sensor, as the disclosure is not limited in this regard.

As discussed previously, various support structures of an additive manufacturing system may exhibit non-negligible amounts of deflection. For example, referring to FIGS. 1 and 4, the first support rail 104a may be supported only at its two ends. As such, the first support rail may experience deflection in a vertical direction (i.e., along the Z axis), due in part to the weight of the first support rail itself, as well as in part to the weight of the recoater assembly that the first support rail supports. With layer heights that may be on the order of tens of micrometers, even minimal deflection of a support structure in an additive manufacturing system may be consequential. As may be appreciated by a person of skill in the art, an amount of deflection of a support rail 104 may vary as a function of position along a length of the support rail. Specifically, the deflection of a support rail may be lesser at points closer to support columns 102 and may be greater at points closer to a center of the support rail. Consequently, a height above a build surface 120 of a portion of a support rail 104 may vary as a function of length along the support rail. Accordingly, in some embodiments, an additive manufacturing system may compensate for such height variations of the support rail by moving both ends of the support rail as a recoater travels along the support rail in order to maintain a constant layer thickness throughout a manufacturing process, For example, referring to FIG. 4, a recoater may initially be positioned near the first support column 102a at a first height above a build surface 120, and may be configured to translate toward the second support column 102b along the first support rail 104a. As the recoater translates away from the first support column, the recoater may be at a position along the first support rail at a second height above the build surface. As explained above, the second height may be less than the first height due to a deflection of the first support rail. To compensate for a difference between the first height and the second height, the first translational attachment 106a and the second translational attachment 106b may translate upwardly, moving the first support rail 104a vertically away from the build surface 120 a distance that may be equal to the difference between the first and second heights. Similarly, the third translational attachment 106c and fourth translational attachment 106d may also translate upwardly, moving the second support rail 104b vertically the same distance, in order to keep the recoater from rotating about an axis parallel to an X axis (i.e., to prevent rolling the recoater). Of course, such a process may occur continuously as the recoater translates along the support rails, allowing the recoater to maintain a constant height above the build surface, thus enabling a layer of constant thickness. Moreover in some embodiments, an additive manufacturing system may include one or more sensors configured to dynamically measure a distance between the recoater assembly and the build surface 120 as the recoater moves along the build surface. The additive manufacturing system may be configured to automatically adjust the vertical position of the recoater assembly along the support columns to maintain a constant distance between the recoater assembly and the build surface for each layer deposited by the recoater.

The inventors have recognized and appreciated that in some instances, a build surface of an additive manufacturing system may become out of level with respect to a master reference level of the additive manufacturing system. As discussed above, some embodiments of additive manufacturing systems may include one or more sensors configured to detect an orientation of a build surface. If the sensors detect that the build surface is misaligned with respect to a recoater assembly, one strategy to compensate for such misalignment may be to reorient the recoater by adjusting the various attachments between rails and columns as discussed above. In addition to this strategy, recoater assemblies that are movable and adjustable relative to a build surface in an additive manufacturing system may also be used to accommodate a misaligned build surface by leveling the build surface, as discussed below in connection with FIGS. 5A-5B.

Figure 5A:
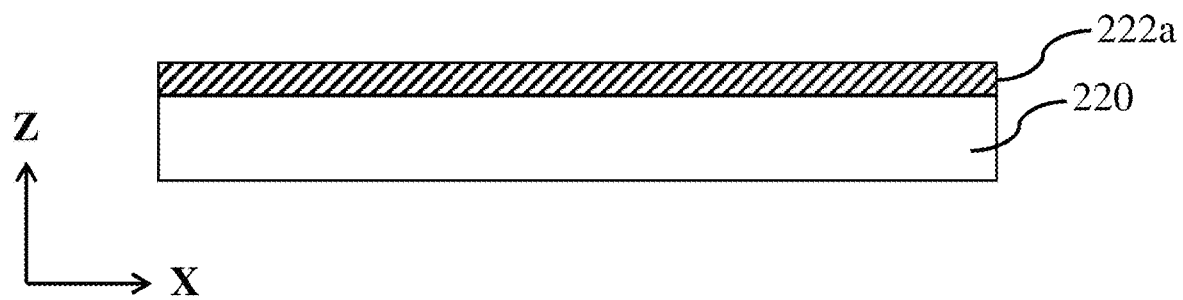
FIG. 5A is a schematic side view of a build surface of an additive manufacturing system in a level orientation, according to some embodiments.

FIG. 5A shows a build surface 220 with a first layer of material (e.g., powder) 222a deposited on the build surface. In FIG. 5A, the build surface 220 is aligned relative to a recoater and master reference orientation of an additive manufacturing system, as shown by the orientation of the Z axis being perpendicular to the build surface. In situations in which a build surface is aligned with respect to a recoater, such as in FIG. 5A, no adjustment to the level of the build surface may be needed.

Figure 5B:
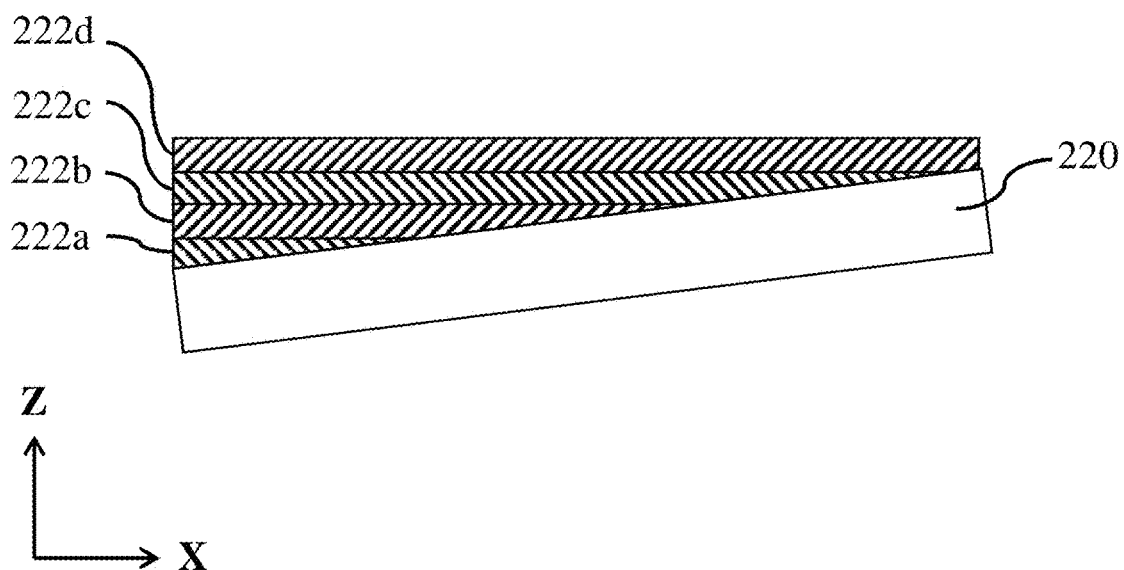
FIG. 5B is a schematic side view of a build surface of an additive manufacturing system in an out-of-level orientation, according to some embodiments.

In contrast, FIG. 5B shows a build surface 220 with multiple layers 222. It should be appreciated that the build surface in this figure is misaligned with respect to a recoater and the master reference orientation of the system, as illustrated by the angle formed between the Z axis and the build surface. In such situations in which the build surface is misaligned with respect to the recoater and master reference orientation of the system, such as in FIG. 5B, the build surface may be leveled by depositing one or more partial layers, as detailed below.

A partial layer may be a layer 222 of precursor material (e.g., powder) that may not cover an entirety of the build surface 220. Partial layers may be achieved by depositing powder during only a portion of the time that a recoater is moving across the build surface. That is, the recoater assembly may stop depositing powder before the recoater finishes moving across the build surface, thus only depositing powder over a portion of the build surface. Once a partial layer is deposited, a portion and/or the entirety of the partial layer may be fused, allowing additional partial layers (or full layers) to be deposited as desired.

Referring to FIG. 5B, a first layer 222a deposited on a misaligned build surface 220 may be a partial layer. The first layer 222a may be deposited such that its top surface is aligned with respect to a recoater assembly (as suggested in FIG. 5B by the parallel relationship between the top surface of the first layer 222a and the X axis). After at least a portion of the first layer 222a is fused, a second layer 222b may be deposited. Because the first layer 222a may be a partial layer, the second layer 222b may be deposited in part on the first layer 222a and in part on the build surface 220. Again, at least a portion of the second layer may be fused, upon which a third layer 222c may be deposited. After fusing at least a portion of the third layer, a fourth layer 222d may be deposited. In the example shown in FIG. 5B, the fourth layer 222d covers the area of the entire build surface 220. Consequently, depositing and selectively fusing layer 222d may fully level the build surface, preparing it for a manufacturing process. While three partial layers 222a-222c are shown in FIG. 5B, it should be understood that the current disclosure is not limited to any particular number of partial layers used in connection with achieving a level build surface. For example, other embodiments may employ fewer than three partial layers, or more than three partial layers.

In some embodiments, a partial layer may include portions having a substantially uniform thickness, as well as portions having a variable thickness. For example, referring to FIG. 5B the third layer 222c may be substantially a uniform thickness for a majority of the layer that overlies layer 222b, but in a portion of layer 222c that is in direct contact with a build surface 220, the layer may begin to taper, yielding a variable thickness for a portion of the layer.

It should be appreciated that an entire partial layer need not be fused or otherwise solidified in order to level a build surface. In some cases, only portions of a partial layer may be fused. For example, only the portions of a partial layer that may be used to support a manufactured part, such as anchor points, may be fused. Selectively fusing one or more partial layers may enable a faster build plate leveling process and may limit powder waste.

Figure 6:
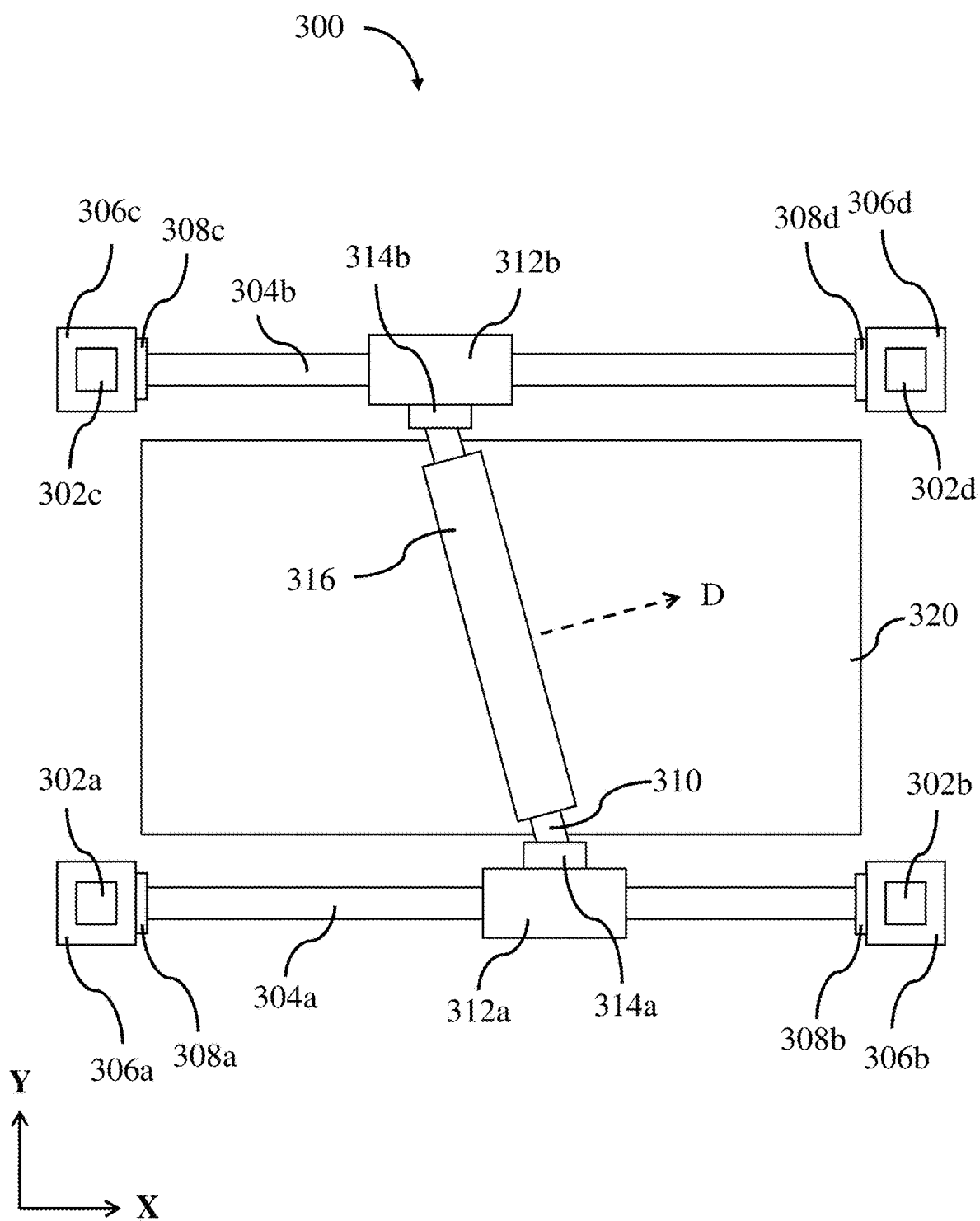
FIG. 6 is a schematic top view of one embodiment of an additive manufacturing system with recoater in an angled orientation.

FIG. 6 shows a top schematic view of one embodiment of an additive manufacturing system 300 including an angled recoater assembly. As discussed above, a recoater may be reoriented about a Z axis (i.e., a "yaw" orientation) by adjusting attachment points between a recoater support and support rails, such as by controlling positions of recoater translational attachments 312. In some embodiments, one of a first recoater translational attachment 312a and a second recoater translational attachment 312b may be actuated, and the other may be passive. In some embodiments, both the first and second recoater translational attachments may be actuated. In embodiments in which both the first and second recoater translational attachments are actuated, a single actuator may be coupled to both attachments, or a dedicated actuator may be associated with each attachment and the dedicated actuators may be coupled through a controller.

The inventors have appreciated multiple advantages associated with a recoater assembly that is able to yaw in this manner. For example, such a recoater assembly may be capable of pushing powder in a desired direction. As would be understood by a person of skill in the art, powder may preferentially track in a direction perpendicular to a length of a recoater blade. In a conventional additive manufacturing system in which an orientation of a recoater may be constrained, powder may only be able to be pushed in a single direction, which may be a direction of travel of a recoater. In additive manufacturing systems with a recoater that may yaw, reorienting a recoater may change a direction in which powder may be pushed by a recoater blade. As shown in FIG. 6, a recoater that is yawed may push powder in a direction D that is distinct from a direction of travel of a recoater (which, in this example, may be a direction parallel to the X axis). In some instances, the direction D in which powder is pushed be adjusted dynamically throughout a manufacturing process and/or during a single recoating step to deposit a layer of material onto a build surface. The ability to direct powder to different portions of the build surface may be advantageous to compensate for areas of high powder usage and/or to direct excess powder away from areas of lower powder usage. For example, as powder is melted and solidified to form portions of a manufactured part, the powder may shrink; consequently, portions of a build surface that contain many part features may use more powder than other portions of the build surface. The ability to direct powder may be useful to refill these areas of high powder usage.

In addition to directing powder, the ability to yaw a recoater as discussed above may be used in connection with detecting obstacles located on a build surface. For example, an obstacle may include a high point from a previous layer, a contaminant, or any other physical object that may impede the motion of the recoater assembly. In some embodiments, a method of detecting an obstacle may include moving a recoater across a build surface in different orientations. As the recoater makes contact with obstacle in these different orientations, the location of the obstacle may be determined as discussed below in connection with FIG. 7.

Figure 7:
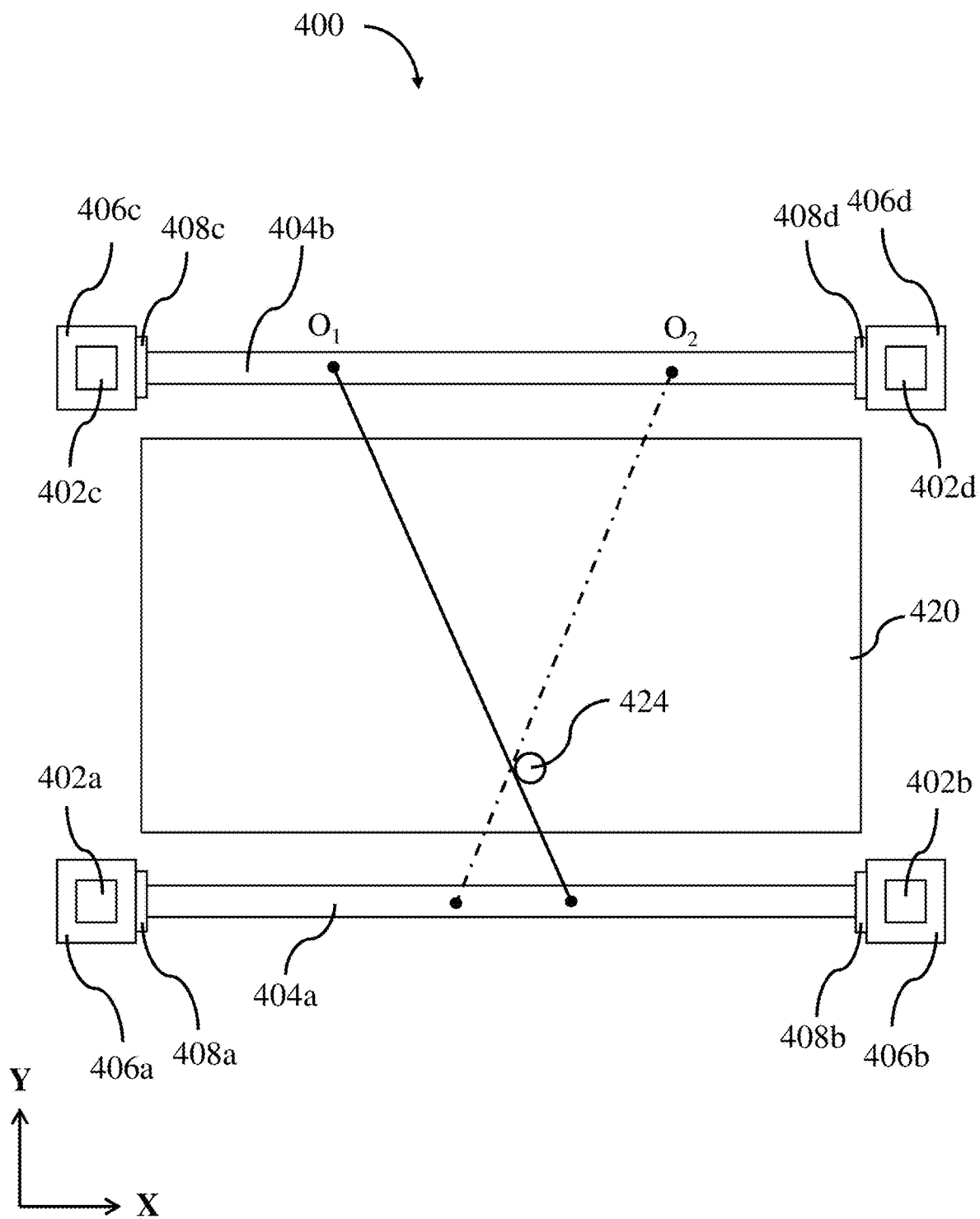
FIG. 7 is a schematic top view of one embodiment an additive manufacturing system configured to detect obstacles on a build surface.

FIG. 7 illustrates one example of a method for detecting an obstacle on a build surface. First, a recoater may be moved across the build surface 420 in a first orientation $O_1$. When the recoater blade makes contact with an obstacle 424, positions of the ends of the recoater assembly may be recorded. For example, the positions of the ends of the recoater may be recorded with one or more encoders, displacement sensors, or by monitoring the current delivered to motors that may move the recoater. Of course, other sensors or mechanisms may be used to record a position of an end of a recoater, and the disclosure is not limited in this regard. With the positions of the two ends of the recoater recorded, a first line across the build surface may be defined. The recoater assembly may subsequently be yawed to a second orientation $O_2$. After yawing the recoater to this second orientation, the process may be repeated, thus defining a second line across the build surface. A location of the obstacle 424 may be determined based on an intersection of the first and second lines.

In addition to the above, the ability to yaw a recoater may have further benefits associated with avoiding damaging a manufactured part and/or a recoater blade as the recoater blade is moved across a build surface to deposit a layer of material. The inventors have appreciated that it may be desirable to avoid a parallel contact between a recoater blade and a straight edge of a manufactured part formed in a prior layer of a manufacturing process (i.e., a previously printed layer). Rather, it may be preferable to approach a straight edge of a manufactured part with the recoater blade at an angle with respect to such part edges. Although strategic part orientation may mitigate some parallel contacts, other parallel contacts may be unavoidable. For example, some parts may include a straight edge that rotates as a function of height, which may greatly increase the chances that at least one layer may contain a straight edge that may be parallel to an orientation of a recoater blade. A recoater assembly that is able to change orientation may be able to avoid parallel edge contacts regardless of part orientation.

Figure 8:
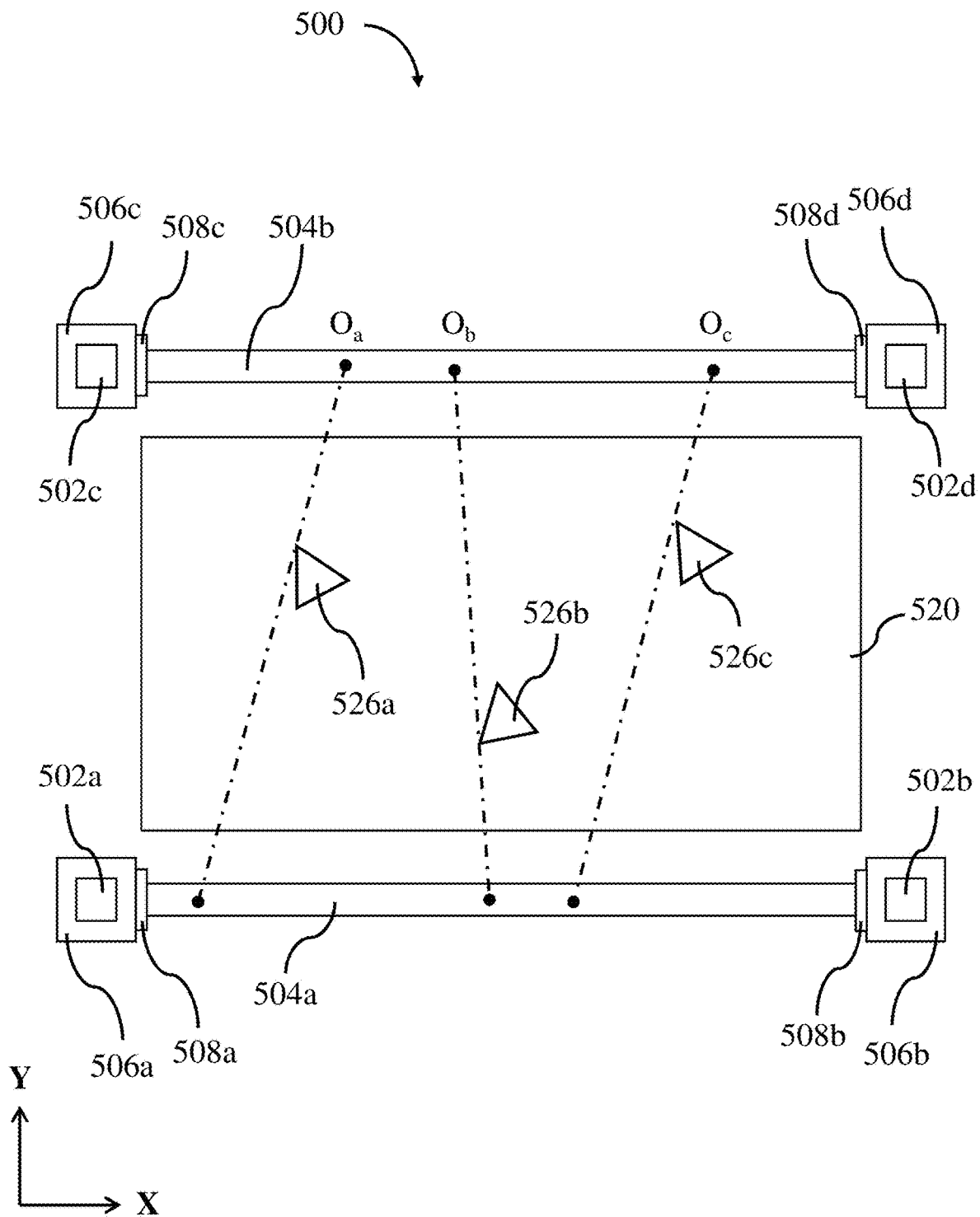
FIG. 8 is a schematic top view of one embodiment an additive manufacturing system illustrating dynamic adjustment of a recoater orientation.

Referring to FIG. 8, a particular layer in a manufacturing process may contain multiple straight-edge obstacles 526. A recoater may initially be in a first configuration in which a length of the recoater is parallel to a Y axis. If the recoater were to travel across a build surface 520 in this first configuration, a recoater blade may make a parallel contact with a first straight-edge obstacle 526a. However, if the recoater yaws into a first orientation $O_a$ prior to reaching the first straight-edge obstacle, as shown in FIG. 8, a parallel contact may be avoided. After moving past the first straight-edge obstacle, the recoater may approach a second straight-edge obstacle 526b. Similarly, if the recoater were to continue travelling in the first orientation $O_a$, the recoater blade may make a parallel contact with the second straight-edge obstacle 526b. However, the recoater may yaw into a second orientation $O_b$ in order to avoid such a parallel contact. Finally, before reaching a third straight-edge obstacle 526c, the recoater may again yaw into a third orientation $O_c$ in order to avoid a parallel contact that may have occurred had the recoater remained in the second orientation $O_b$ upon reaching the third straight-edge obstacle 526c. As stated above, it should be understood that yawing of the recoater may be accomplished dynamically as the recoater moves across the build surface, and the recoater assembly need not stop in order to yaw. In this manner, the recoater assembly may be adjusted to avoid parallel contact with any suitable number of edges in a part during an additive manufacturing process.

In some instances, a recoater blade of an additive manufacturing system may become damaged (e.g., due to contacts with obstacles and/or via normal wear on the recoater blade). For example, repeated contacts over time between the recoater blade and powder, part edges, or obstacles may cause cuts and/or grooves to form in the recoater blade. These cuts and/or grooves may undesirably leave tracks in layers of powder, which may in turn cause voids and/or inclusions in manufactured parts, which may compromise the quality of manufactured parts. In some instances, recoater blade quality may be determined by capturing images after each layer of a manufacturing process and automatically scanning the captured images for discrepancies between the captured images and predicted layer images (from, for example, a CAD/CAM program). In other instances, damage to a recoater blade may be detected by scanning or imaging a layer of powder after it has been deposited by the recoater but before any fusion of the layer has occurred. For example, damage to the recoater blade may be detected as lines, divots, or other defects in what should otherwise be a smooth powder surface.

Depending on the particular embodiment, a recoater blade may be made out of any suitable types of materials, such as metal, ceramic, plastic, and/or rubber. However, regardless of the particular type of material used for the recoater blade, the blade may become damaged during use, including during an additive manufacturing process. In some instances, a time period over which a recoater blade is useable (which may be determined based on a number of coating passes that can be made with a particular recoater blade) may be less than a time period associated with a single additive manufacturing process. For example, a single additive manufacturing process may involve a number of layers that is larger than the number of passes that can be performed with a single recoater blade. Consequently, a recoater blade may need to be replaced during the course of a manufacturing process.

In conventional additive manufacturing systems, recoater blade replacement may be performed manually by an operator. Such replacements may be slow, requiring sufficient time to allow a manufactured part to cool, which may alter the thermal history of the part and potentially affect build quality. Of course, such manual intervention also requires active participation of an operator, preventing the operator from performing some other useful task. Additionally, as discussed above, manual replacement of a recoater blade may require purging a build volume to permit access to a recoater assembly located within the build volume, which may both be time intensive and result in wasted process gas.

In some conventional additive manufacturing systems, an automated system may be included within the build volume to enable automatic exchange of the recoater blade. Additional blades may be pre-loaded into the build volume such that an automated mechanism may be able to exchange one or more blades automatically. However, the inventors have recognized numerous disadvantages associated with such systems. For example, these systems require that a sufficient number of blades be loaded for a given manufacturing process. As the size of a build volumes increases, the number of printed layers to complete a full process may start to approach 10,000 or more layers. Being able to predict and support enough spare blades to enable sufficient blade exchange to support some manufacturing processes may require an internal exchange and storage mechanism that is too large, and/or too expensive to be practical. In contrast, the systems and methods described herein may allow a new blade to be introduced from an external environment (e.g., manufacturing space having a non-inert gas environment) into a gas-tight build volume without contamination of an inert gas environment within the build volume. This exchange may be performed an unlimited number of times for a given manufacturing process, and the size and cost of the system may be substantially less compared to conventional approaches.

Figure 9:
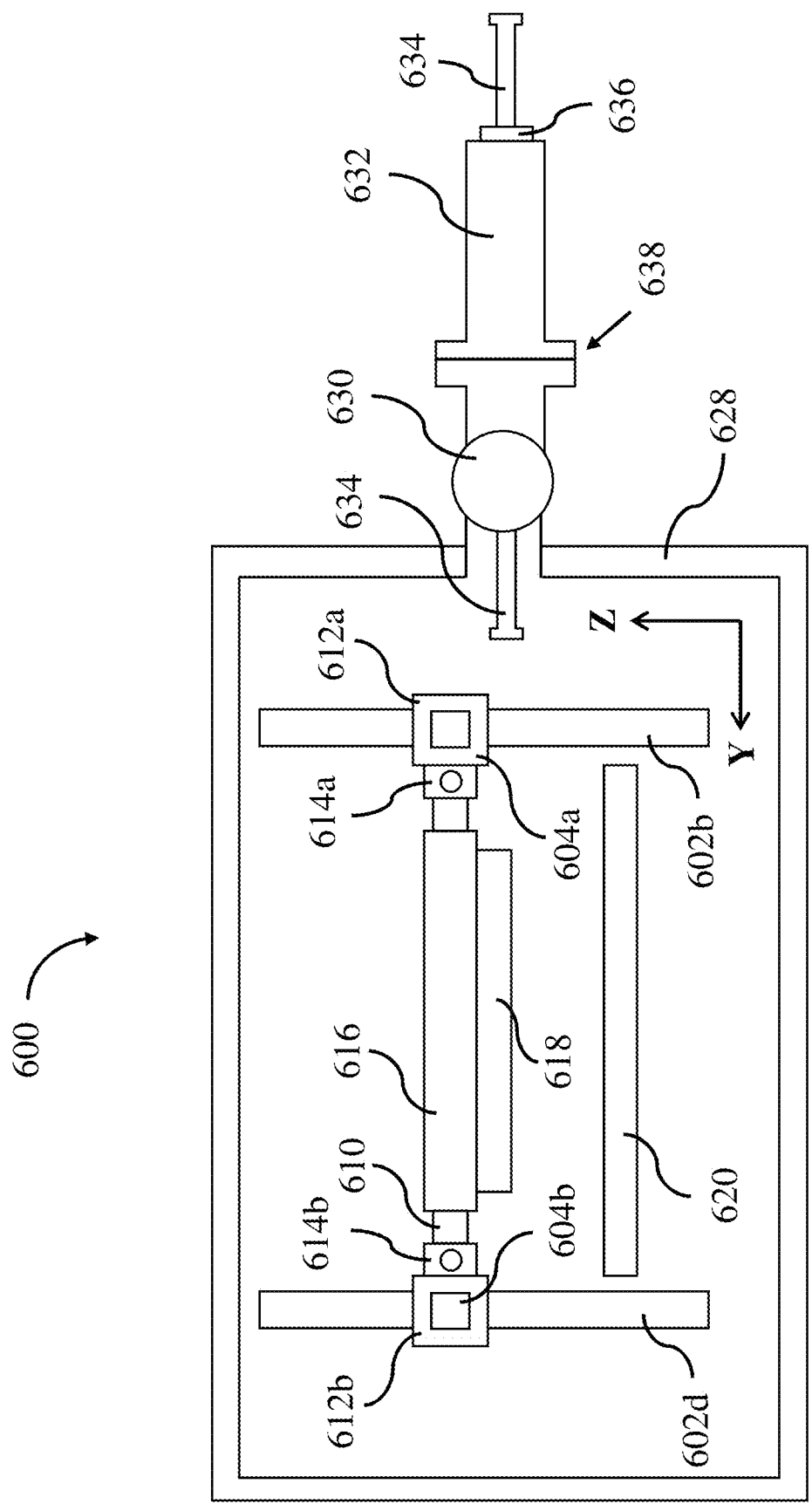
FIG. 9 is a schematic cross sectional front view of one embodiment of an additive manufacturing system including a recoater blade exchange system.

The inventors have appreciated that an additive manufacturing system including a recoater blade exchange system that requires minimal interruption to a manufacturing process and that permits exchange of blades between an exterior of an enclosed build volume and an interior of the build volume may address many of the above-mentioned shortcomings of conventional additive manufacturing systems. FIG. 9 shows one embodiment of a recoater blade exchange system for an additive manufacturing system 600. Similar to the embodiments described above, the system includes a recoater assembly including a recoater support 610, a recoater blade housing 616, and a recoater blade 618.

When replacement of the recoater blade 618 is desired (e.g., if the recoater blade becomes damaged), the recoater assembly may be moved to a recoater blade exchange position within the build chamber 628 to facilitate exchange of the recoater blade. In particular, the system 600 includes a recoater blade exchange chamber 632 mounted to the build chamber 628 at a position associated with the recoater blade exchange position. Once in the recoater blade exchange position, the recoater blade housing 616 may be detached from the recoater support 610. A recoater blade gripper 634 may be at least partially received into the build chamber through a valve 630 to engage the recoater blade housing 616. Subsequently, the recoater blade gripper may pull the recoater blade housing 616 (and the recoater blade 618) out of the build chamber and into the recoater blade exchange chamber 632. In some embodiments, a new recoater blade housing and recoater blade may then be inserted into the build chamber with the recoater blade gripper and attached to the recoater support. In other embodiments, the recoater blade may be removed from the blade housing after being removed from the build chamber, and a replacement blade may be attached to the recoater blade housing. The housing and replacement blade may be reinserted into the build chamber and attached to the recoater support via the gripper, as discussed above.

In some embodiments, assemblies of recoater blades and recoater blade housings may be prepared and stored for subsequent use so that a plurality of such assemblies may be available during an additive manufacturing process. Depending on the embodiment, extra assemblies may be stored within a build chamber 628, in a recoater blade exchange chamber 632, or external to an additive manufacturing system 600. In some embodiments, an additive manufacturing system may include multiple recoater blade exchange chambers. For example, a used and/or damaged recoater blade may be removed into a first blade exchange chamber, and subsequently, the recoater may be moved into alignment with a second blade exchange chamber containing a replacement blade, and the replacement blade (and blade housing) may be attached to the recoater support. The used and/or damaged blade may later be removed from the first chamber, and a new blade may be prepared and loaded into the first chamber for subsequent replacement operations.

In the depicted embodiment, the recoater blade exchange chamber 632 is coupled to the build chamber 628 through a valve 630. For example, the valve may be an isolation valve, such as a ball valve. The valve may be movable between a closed position, in which the build chamber 628 is isolated from an outside environment, and an open position in which the valve may allow access into the build chamber through the valve. In some embodiments, the recoater blade exchange system may include a single valve through which used and/or damaged recoater blade assemblies may be removed, and through which new recoater blade assemblies may be inserted. In other embodiments, two or more valves may be included. For example, a first valve may be used for removal of used recoater blade assemblies, and a second valve may be used for insertion and attachment of replacement recoater blade assemblies. In embodiments with two or more valves, an additive manufacturing system 600 may include multiple recoater blade exchange chambers 632, multiple recoater blade exchange positions, and/or multiple recoater blade grippers 634.

Referring again to FIG. 6, the system 600 includes a seal 636 positioned at an end of the recoater blade exchange chamber 632 opposite the valve 630. The seal may allow a portion of a recoater blade gripper 634 to extend outside of a recoater blade exchange chamber 632, for example, to be manipulated by an operator. The seal may avoid or prevent gas exchange between the interior build chamber 628 and an external environment when the valve 630 is in the open position. Depending on the embodiment, the seal may be a spring loaded lip seal, a labyrinth seal, or any other suitable type of seal, as the disclosure is not limited in this regard.

As noted above, the recoater blade gripper 634 may be inserted through the valve 630 and into the build chamber 628. For example, the gripper may be operated manually (e.g., via manipulation of a grip on an exterior of the system, or the gripper may be operated automatically, such as with a linear actuator. The recoater blade gripper may be configured to engage with and move a recoater blade housing and recoater blade into and out of the build chamber via any suitable type of engagement, such as a mechanical, magnetic, electrical, and/or adhesive interface.

In some embodiments, the recoater blade exchange chamber 632 may be removably attachable to the enclosure around the build volume 628 via a joint 638, such as a breakable union joint. In this manner, after removing a used recoater blade 618 into the recoater blade exchange chamber 632, the valve 630 may be closed and, the joint 638 may be disconnected, and the recoater blade exchange chamber may be removed from the system. Subsequently, a replacement recoater blade may be loaded into the recoater blade exchange chamber, and the chamber may be reattached to the joint 638. After tightening the joint to secure the exchange chamber, the exchange chamber may be purged with inert gas to remove any oxygen and/or moisture before opening the valve 630 to insert the replacement blade into the build volume.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method of leveling a build surface of an additive manufacturing system, the method comprising:
    detecting an orientation of the build surface;
    comparing the orientation of the build surface to a reference orientation to detect a misalignment of the build surface, wherein the reference orientation is perpendicular to a vertical direction of the additive manufacturing system;

in response to detecting the misalignment of the build surface depositing at least a first partial layer of material across a first portion of the build surface that is less than the entire build surface, and depositing a second layer onto the first partial layer while the first partial layer covers only the first portion, the first partial layer having a non-uniform thickness on the build surface; and fusing at least a portion of each partial layer of material to form at least a portion of the build surface.

2. The method of claim 1, wherein the portion of each partial layer defines at least one anchor point by which a manufactured part is coupled to the build surface during an additive manufacturing process.

3. The method of claim 1, wherein the orientation of the build surface after fusing the portion of each partial layer is substantially equal to the reference orientation.

4. The method of claim 1, wherein the reference orientation is a level orientation.

5. The method of claim 1, wherein depositing at least the first partial layer of material comprises depositing two or more partial layers.

6. The method of claim 5, wherein the fused portions of each partial layer are aligned.

7. The method of claim 1, wherein the portion of each partial layer comprises substantially all of the respective partial layer.

8. The method of claim 1, wherein the reference orientation is in a reference plane perpendicular to the vertical direction of the additive manufacturing system.

9. A method of locating an obstacle on a build surface, the method comprising:

translating a recoater blade in a first orientation across the build surface in a first pass;

making a first contact between the obstacle and the recoater blade;

detecting a first contact point on the build surface based on the first contact;

translating the recoater blade in a second orientation across the build surface in a second pass;

making a second contact between the obstacle and the recoater blade;

detecting a second contact point on the build surface based on the second contact; and determining a position of the obstacle on the build surface based on the first contact point and the second contact point.

10. The method of claim 9, wherein determining the position of the obstacle on the build surface comprises:

determining a first line passing through the first contact point and parallel to the recoater blade when the recoater blade is in the first orientation;

determining a second line passing through the second contact point and parallel to the recoater blade when the recoater blade is in the second orientation; and determining an intersection point of the first line and the second line.

11. The method of claim 10, wherein determining the first line comprises determining first positions of ends of the recoater blade when the recoater blade is in the first orientation, and wherein determining the second line comprises determining second positions of the ends of the recoater blade when the recoater blade is in the second orientation.

12. The method of claim 11, wherein determining the first and second positions of the ends of the recoater blade comprises reading at least one sensor associated with the recoater blade.

13. The method of claim 12, wherein the at least one sensor comprises a motor encoder and/or a displacement sensor.

14. The method of claim 11, wherein determining the first and second positions of the ends of the recoater blade comprises monitoring an amount of current delivered to one or more motors associated with the recoater blade.

15. A method of operating a recoater of an additive manufacturing system, the method comprising:

obtaining a shape of a fused portion of a layer in an additive manufacturing process;

determining a portion of the shape of the fused portion of the layer having an edge parallel to a recoater blade when the recoater blade is in a first orientation;

displacing the recoater blade across a portion of the layer; and yawing the recoater blade from the first orientation to a second orientation prior to the recoater blade contacting the edge to reorient the recoater blade such that the recoater blade is not parallel to the edge when the recoater blade is in the second orientation.

16. The method of claim 15, wherein the recoater blade is parallel to the layer in both the first orientation and the second orientation.

17. The method of claim 15, further comprising displacing the recoater blade past the edge while the recoater blade is in the second orientation.

18. The method of claim 17, further comprising yawing the recoater blade from the second orientation to the first orientation after displacing the recoater blade past the edge.

19. The method of claim 17, further comprising yawing the recoater blade from the second orientation to a third orientation after displacing the recoater blade past the edge.

20. The method of claim 15, wherein the recoater blade is perpendicular to a direction of movement of the recoater blade across the layer.

21. The method of claim 15, wherein yawing the recoater blade from the first orientation to the second orientation comprises dynamically yawing the recoater blade as the recoater blade is displaced across the portion of the layer.

22. The method of claim 15, wherein the fused portion of the layer comprises a manufactured part, and wherein the edge comprises a straight edge of the manufactured part.

23. The method of claim 15, wherein the step of yawing the recoater blade from the first orientation to the second orientation is performed in response to determining that the edge of the fused portion of the layer is parallel to the recoater blade when the recoater blade is in the first orientation.

* * * * *